(12) United States Patent
Gomez et al.

(10) Patent No.: US 9,665,455 B2
(45) Date of Patent: May 30, 2017

(54) INPUT MODULE FOR PROGRAMMABLE LOGIC CONTROLLER

(71) Applicant: Schneider Electric Industries SAS, Rueil-Malmaison (FR)

(72) Inventors: Gerard Gomez, Le Broc (FR); Pascal Chapier, Valbonne (FR)

(73) Assignee: SCHNEIDER ELECTRIC INDUSTIRES SAS, Rueil-Malmaison (FR)

( * ) Notice: Subject to any disclaimer, the term of this patent is extended or adjusted under 35 U.S.C. 154(b) by 98 days.

(21) Appl. No.: 14/849,102

(22) Filed: Sep. 9, 2015

(65) Prior Publication Data

US 2016/0077943 A1 Mar. 17, 2016

(30) Foreign Application Priority Data

Sep. 16, 2014 (FR) ..................... 14 58711

(51) Int. Cl.
| | |
|---|---|
| *G06F 11/00* | (2006.01) |
| *G06F 11/263* | (2006.01) |
| *G06F 11/22* | (2006.01) |
| *G06F 11/273* | (2006.01) |
| *G06F 13/362* | (2006.01) |
| *G05B 9/03* | (2006.01) |
| *G05B 19/05* | (2006.01) |

(52) U.S. Cl.
CPC ............. *G06F 11/263* (2013.01); *G05B 9/03* (2013.01); *G05B 19/058* (2013.01); *G06F 11/221* (2013.01); *G06F 11/273* (2013.01); *G06F 13/362* (2013.01); *G05B 2219/1194* (2013.01); *G05B 2219/1197* (2013.01)

(58) Field of Classification Search
CPC ........ G06F 11/27; G06F 11/25; G06F 11/273; G06F 11/221; G06F 11/263
See application file for complete search history.

(56) References Cited

U.S. PATENT DOCUMENTS

| | | | |
|---|---|---|---|
| 4,593,380 A | 6/1986 | Kocher et al. | |
| 5,263,170 A | 11/1993 | Kato | |
| 6,028,439 A * | 2/2000 | Arkin ............... | G01R 31/31907 324/537 |

(Continued)

OTHER PUBLICATIONS

French Preliminary Search Report issued May 13, 2015 in French Application 14 58711, filed on Sep. 16, 2014 (with English Translation of Category of Cited Documents).

*Primary Examiner* — Charles Ehne
(74) *Attorney, Agent, or Firm* — Oblon, McClelland, Maier & Neustadt, L.L.P.

(57) ABSTRACT

The invention relates to an input module (32) for a programmable logic controller able to be connected to a plurality of elements of an automated chain, the module (32) comprising:
  inputs (32A, 32B), each input (32A, 32B) being able to receive the signal from at least one element of the plurality of elements,
  interfaces (40A, 40B), each interface (40A, 40B) being associated with a single input and comprising at least one output (40A6, 40B6) able to operate in three different states,
  a test block (42), and
  a processing sub-module (24) able to compare the state of the output (40A6, 40B6) of each interface (40A, 40B) with the state imposed by the test block (42) and to deduce an operating anomaly of the module (32, 34) therefrom.

11 Claims, 2 Drawing Sheets

(56) References Cited

U.S. PATENT DOCUMENTS

| | | | | |
|---|---|---|---|---|
| 6,078,851 A | * | 6/2000 | Sugitani | G01D 3/08 |
| | | | | 701/30.6 |
| 6,546,507 B1 | * | 4/2003 | Coyle | G06F 11/221 |
| | | | | 714/32 |
| 6,748,564 B1 | * | 6/2004 | Cullen | G01R 31/318547 |
| | | | | 714/728 |
| 2004/0010324 A1 | | 1/2004 | Bednar et al. | |
| 2007/0057690 A1 | * | 3/2007 | Arakawa | H03K 19/00392 |
| | | | | 326/9 |
| 2011/0178612 A1 | | 7/2011 | Nakatani et al. | |

* cited by examiner

INPUT MODULE FOR PROGRAMMABLE LOGIC CONTROLLER

CROSS-REFERENCE

This patent application claims the benefit of document FR 14/58 711 filed on Sep. 16, 2014 which is hereby incorporated by reference.

FIELD OF THE INVENTION

The present invention relates to an input module for a programmable logic controller, a controller including such a module and a method for testing such a module.

BACKGROUND OF THE INVENTION

A programmable logic controller, called controller in the rest of the description, is a piece of automated equipment capable of driving, controlling and/or monitoring one or more processes. Such a controller is often referred to using the acronym PLC. For example, the controller makes it possible to control machines on an assembly line in a plant or to drive automatic handling systems.

The controller is generally built on a modular-type architecture. Consequently, the controller comprises different modules. In particular, the controller includes a communication module able to ensure the exchange of data between the other modules of the controller. This communication module thus constitutes a transmission bus generally referred to as "backplane" bus.

The number of modules of the controller depends on the needs of the process or processes to be automated. Typically, the controller comprises a power module, a central unit, processing modules and input modules.

The power module provides, via the communication module, electricity making it possible to see to the operation of the other modules of the controller.

The central unit is a computation unit or processor typically referred to as a CPU (central processing unit). The central processing unit is a module including onboard software comprising the instructions to be executed by the onboard software in order to perform the desired automated operations. The central processing unit also generally comprises a front facing connection to programming tools of the PC type.

Each processing module is able to process data.

Each input module makes it possible to ensure secure interfacing between the central processing unit and elements interacting with the controller. As an illustration, such elements are sensors, pushbuttons, actuators, lighted indicators or valves. This diversity means that a controller usually comprises several input modules, some input modules being digital, others being analog.

In order to ensure secure interfacing, and more generally security as well as proper operation of the controller, each of the modules is able to detect an operating anomaly. Depending on the cases, an operating anomaly occurs in case of malfunction of the element interacting with the controller, the connection between the element and the controller, or the input module.

In order to detect the presence of such an anomaly, it is known to provide each input module with at least two identical interfaces per input, the output of the two interfaces being connected to a comparator able to compare the output signals. If there is no operating anomaly, the comparator does not detect any difference between the two signals, since the two interfaces are identical. When the comparator detects a significant difference between the two output signals, that means that a malfunction has occurred. Switches in the circuit at each interface make it possible to perform a test sequence of the interfaces to determine whether the malfunction is coming from the input module or an element outside the input module. Furthermore, in order to avoid failures of the interfaces leading to an identical signal on both output signals, the test sequence should be done periodically to guarantee that operation is normal. When this test sequence is done, neither of the two tested interfaces transmits the signal when the two interfaces are tested at the same time. As a result, it is often chosen to use an input module having three identical interfaces per input.

However, such modules are cumbersome.

SUMMARY OF THE INVENTION

There is therefore a need for an input module for a programmable logic controller having a reduced bulk while guaranteeing a good level of safety for the programmable logic controller.

To that end, an input module for a programmable logic controller is proposed that can be connected to a plurality of elements of an automated chain, the input module comprising inputs, each input being able to receive the signal from at least one element of the plurality of elements. The input module comprises interfaces, each interface being associated with a single input and comprising at least one output able to operate in three different states: a forcing state corresponding to the maximum voltage that the output of the interface can deliver, a low state corresponding to the minimum voltage that the output of the interface can deliver, and a read state in which the output of the interface is able to deliver an image of the signal received by the input associated with the interface in question. The input module also comprises a test block connected to each of the interfaces and able to impose the state of the output of each interface, and a processing sub-module able to compare the state of the output of each interface with the state imposed by the test block and to deduce an operating anomaly of the input module therefrom when the state of the output of at least one interface differs from the state imposed by the test block.

According to specific embodiments, the input module comprises one or more of the following features, considered alone or according to any technically possible combination:
- each interface comprises components having a known failure mode, preferably each component being uniquely chosen from the group consisting of a resistance, a transistor and diode.
- each interface is identical.
- each interface includes a single transistor able to modify the state of the output of the interface.
- the input module further includes an isolating part isolating the processing sub-module from the interfaces and the test block.
- the input module further includes a power source specific to the test block.
- the processing sub-module is able to determine an operating anomaly of at least one of the elements in the group made up of the two interfaces, the test block and the isolating part when the state of the output of at least one interface differs from the forcing state while the state imposed by the test block is the forcing state, a lack of operating anomaly when the test block is not powered on, and an operating anomaly of at least one of the elements in the group consisting of the interfaces and the test block when the state of the output of at least one interface differs from the low state while the state imposed by the test block is the low state.

the processing sub-module is able to cyclically impose the forcing state, the low state, then the read state at each output of each interface.

The invention also relates to a programmable logic circuit including at least one input module as previously described.

The invention also relates to a method for testing an input module for a programmable logic circuit able to be connected to a plurality of elements of an automated chain, the input module comprising inputs, each input being able to receive a signal coming from at least one element of the plurality of elements. The input module comprises interfaces, each interface being associated with a single input and comprising at least one output able to operate in three different states: a forcing state corresponding to the maximum voltage that the output of the interface can deliver, a low state corresponding to the minimum voltage that the output of the interface can deliver, and a read state in which the output of the interface is able to deliver an image of the signal received by the input associated with the interface in question. The input module comprises a test block connected to each of the interfaces and able to impose the state of the output of each interface, and a processing sub-module able to compare the state of the output of each interface with the state imposed by the test block and to deduce an operating anomaly of the input module therefrom when the state of the output of at least one interface differs from the state imposed by the test block. The method comprises the steps of imposing a forcing state on each output of each interface, verifying the operating state of the input module when a forcing state is imposed on each output of each interface, imposing a low state on each output of each interface, verifying the operating state of the input module, and deducing the operating state of the input module based on the results of the verification steps.

BRIEF DESCRIPTION OF THE DRAWINGS

Other features and advantages of the invention will appear upon reading the following description of embodiments of the invention, provided as an example only and in reference to the drawings, which are.

DETAILED DESCRIPTION OF THE PREFERRED EMBODIMENTS

Figure 1:
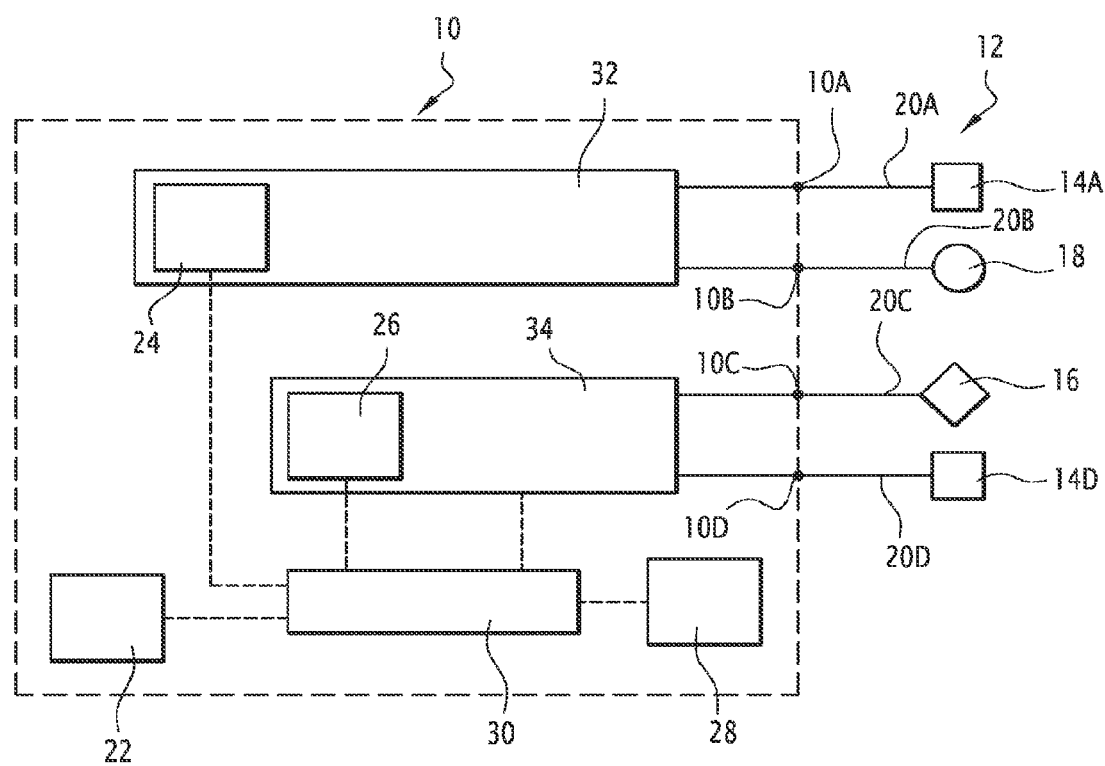
FIG. 1, a diagram of an example controller interacting with a plurality of elements, and FIG. 2, a diagram of an input module of the controller of FIG. 1.

As shown by FIG. 1, a controller 10 is proposed interacting with a plurality of elements 12 that are part of an automated chain.

Among the elements 12 of the automated chain, for simplification reasons, only eight are shown in FIG. 1, knowing that in practice, the number of elements 12 depends on the process that the controller 10 makes it possible to automate. In complex processes, the number of elements often exceeds one hundred.

In the case of FIG. 1, two sensors 14A, 14D, an actuator 16 and an emergency stop button 18 are shown. The two sensors 14A, 14D, the actuator 16 and the emergency stop button 18 are connected by a respective cable 20A, 20D, 20C, 20B to the controller 10.

The controller 10 is a programmable logic controller.

The controller 10 includes inputs/outputs 10A, 10B, 10C and 10D, a power module 22, a central processing unit 28, a communication module 30 and a first input module 32 comprising a first processing sub-module 24 and a second input/output module 34 comprising a second processing sub-module 26.

The first input 10A is connected to the first sensor 14A via the first cable 20A.

The second input 10B is connected to the emergency stop button 18 via the second cable 20B.

The third output 10C is connected to the actuator 16 via the third cable 20C.

The fourth input 10D is connected to the second sensor 14D via the fourth cable 20D.

The power module 22 provides, via the communication module 30, the electricity making it possible to ensure the operation of the other modules 28, 30, 32, 34 of the controller 10.

The first processing sub-module 24 is able to process the data from the first input module 32. As an example, the first processing module 24 is able to perform data filtering.

Similarly, the second processing sub-module 26 is able to process the data from the second module 34.

The central processing unit 28 is able to collect the data processed by the processing sub-modules 24 and 26 and to make and implement decisions based on the processed data.

The communication module 30 is able to see to the communication of data between the different modules 22, 28, 32 and 34 of the controller 10. This is indicated in FIG. 1 by dotted lines.

The first input module 32 is connected to the first two inputs 10A and 10B of the controller 10. The first input module 32 is connected to the first processing module 24 and is able to provide secure interfacing between the first processing module 24 and the sensor 14A and the emergency stop button 18 respectively connected to the inputs 10A and 10B.

Figure 2:
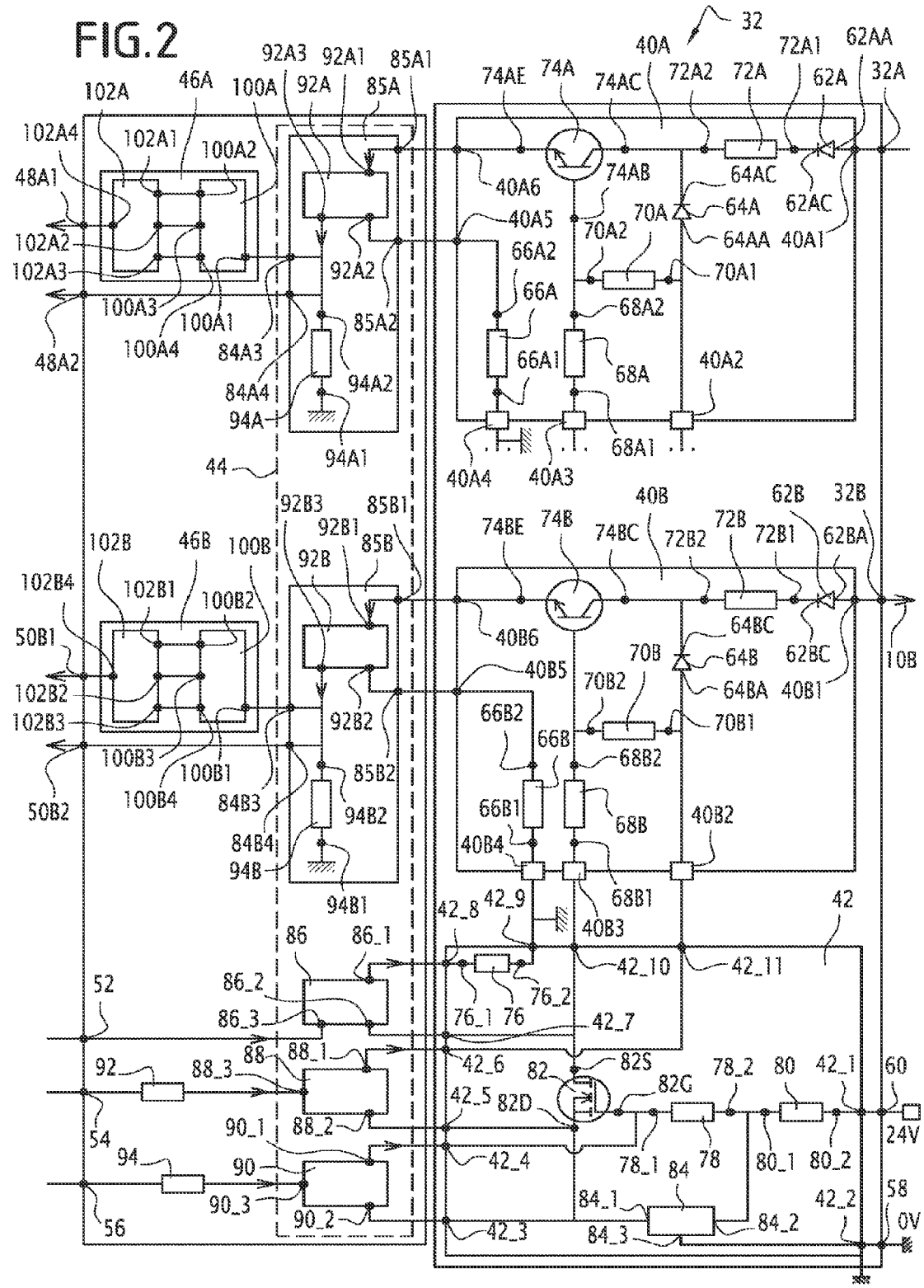

An example electrical diagram for the first input module 32 is shown in FIG. 2.

The first input module 32 comprises two inputs 32A, 32B, a first interface 40A, a second interface 40B, a test block 42, an isolating part 44, a first diagnostic block 46A, a second diagnostic block 46B, four test commands for the interfaces 40A and 40B that are four outputs 48A1, 48A2, 50B1 and 50B2 and five inputs 52, 54, 56, 58 and 60.

The first input 32A of the first input module 32 is connected to the first input 10A of the controller 10.

The second input 32B of the first input module 32 is connected to the second input 10B of the controller 10.

The first interface 40A includes two diodes 62A, 64A, four resistances 66A, 68A, 70A, 72A, a transistor 74A and six terminals 40A1, 40A2, 40A3, 40A4, 40A5 and 40A6.

The first diode 62A includes an anode 62AA and a cathode 62AC.

The second diode 64A includes an anode 64AA and a cathode 64AC.

The first resistance 66A includes a first terminal 66A1 and a second terminal 66A2.

The second resistance 68A includes a first terminal 68A1 and a second terminal 68A2.

The third resistance 70A includes a first terminal 70A1 and a second terminal 70A2.

The fourth resistance 72A includes a first terminal 72A1 and a second terminal 72A2.

The transistor 74A is, according to the example of FIG. 2, a PNP bipolar transistor including three electrodes: a base 74AB, a collector 74AC and a transmitter 74AE.

The anode 62AA of the first diode 62A is connected to the first terminal 40A1 of the first interface 40A. The cathode 62AC of the first diode 62A is connected to the first terminal 72A1 of the fourth resistance 72A.

The anode 64AA of the second diode 64A is connected on the one hand to the second terminal 40A2 of the first interface 40A and on the other hand to the first terminal 70A1 of the third resistance 70A. The cathode 64AC of the second diode 64A is connected to the second terminal 72A2 of the fourth resistance 72A and the collector 74AC of the transistor 74A.

The first terminal 66A1 of the first resistance 66A is connected to the fourth terminal 40A4 of the first interface 40A, while the second terminal 66A2 of the first resistance 66A is connected to the fifth terminal 40A5 of the first interface 40A.

The first terminal 68A1 of the second resistance 68A is connected to the third terminal 40A3 of the first interface 40A. The second terminal 68A2 of the second resistance 68A is connected to the base 74AB of the transistor 74A and the second terminal 70A2 of the third resistance 70A.

The first terminal 70A1 of the third resistance 70A is connected to the second terminal 40A2 of the first interface 40A and the anode 64AA of the second diode 64A. The second terminal 70A2 of the third resistance 70A is connected to the base 74AB of the transistor 74A and the second terminal 68A2 of the second resistance 68A.

The first terminal 72A1 of the fourth resistance 72A is connected to the cathode 62AC of the first diode 62A. The second terminal 72A2 of the fourth resistance 72A is connected to the cathode 64AC of the second diode 64A and the collector 74AC of the transistor 74A.

The base 74AB of the transistor 74A is connected to the second terminal 68A2 of the second resistance 68A and the second terminal 70A2 of the third resistance 70A. The transmitter 74AE of the transistor 74A is connected to the sixth terminal 40A6 of the first interface 40A. The collector 74AC of the transistor 74A is connected to the cathode 64AC of the second diode 64A and the second terminal 72A of the fourth resistance 72A.

The first terminal 40A1 of the first interface 40A is connected to the first input 32A of the first input module 32.

The second terminal 40A2, third terminal 40A3 and fourth terminal 40A4 of the first interface 40A are connected to the test block 42. For simplification reasons, the associated connections are not shown in FIG. 2. Dots symbolize the existence of such connections. Furthermore, the fourth terminal 40A4 of the first interface 40A is connected to the ground.

The fifth terminal 40A5 and sixth terminal 40A6 of the first interface 40A are connected to the insulating part 44.

It should be noted that the sixth terminal 40A6 of the first interface 40A is an output able to operate in three different states: a forcing state, a low state and a read state. In the forcing state, the sixth terminal 40A6 of the first interface 40A is able to deliver a forcing voltage delivered by the test block 42 (for example, 5 V in the specific case of FIG. 2, the forcing voltage most often corresponding to the maximum voltage that the test block 42 can deliver), the low state, the sixth terminal 40A6 of the first interface 40A is able to deliver a minimum voltage (usually 0 V), and in the read state, the sixth terminal 40A6 of the first interface 40A is able to deliver an image of the signal received by the first input or to receive the control signal from the first sensor 14A, i.e., the current delivered by the first sensor 14A.

The second interface 40B is similar to the first interface 40A, but interacts with the second sensor 14B instead of the first sensor 14A. The same comments as above therefore apply to the second interface 40B, replacing the letter A with the letter B in the reference when applicable.

The test block 42 includes three resistances 76, 78, 80, a transistor 82, a voltage regulator 84 and eleven terminals 42_1, 42_2, 42_3, 42_4, 42_5, 42_6, 42_7, 42_8, 42_9, 42_10 and 42_11.

The first resistance 76 of the test block 42 includes a first terminal 76_1 and a second terminal 76_2.

The second resistance 78 of the test block 42 includes a first terminal 78_1 and a second terminal 78_2.

The third resistance 80 of the test block 42 includes a first terminal 80_1 and a second terminal 80_2.

The transistor 82 of the test block 42 is, according to the example of FIG. 2, a field effect transistor including three electrodes: a gate 82G, a drain 82D and a source 82S.

The transistor 82 makes it possible to connect the reference voltage of the voltage regulator 84 to the interfaces 40A and 40B to limit the current circulating in each of the interfaces in read mode. The transistor 82 also makes it possible to disconnect the voltage reference from the voltage regulator 84 relative to the interfaces 40A and 40B to position those interfaces 40A and 40B in the low state.

The voltage regulator 84 includes a first terminal 84_1, second terminal 84_2 and a third terminal 84_3. The first terminal 84_1 corresponds to the output, the second terminal 84_2 to the input and the third terminal 84_3 to 0 V.

The voltage regulator 84 is able to provide a reference voltage to the interfaces 40A and 40B to limit the current circulating through the interface in read mode. The regulator is also able to provide the forcing voltage for the interfaces 40A and 40B in the forcing mode. For example, in such a forcing mode, the voltage regulator is able to provide a voltage of 5 V.

The first terminal 76_1 of the first resistance 76 of the test block 42 is connected to the eighth terminal 42_8 of the test block 42. The second terminal 76_2 of the first resistance 76 of the test block 42 is connected to the ninth terminal 42_9 of the test block 42.

The first terminal 78_1 of the second resistance 78 of the test block 42 is connected to the fourth terminal 42_4 of the test block 42 and to the gate 82G of the transistor 82 of the test block 42. The second terminal 78_2 of the second resistance 78 of the test block 42 is connected to the second terminal 84_2 of the voltage regulator 84 and to the first terminal 80_1 of the third resistance 80 of the test block 42.

The first terminal 80_1 of the third resistance 80 of the test block 42 is connected to the second terminal 78_2 of the second resistance 78 of the test block 42 and the second terminal 84_2 of the voltage regulator 84. The second terminal 80_2 of the third resistance 80 of the test block 42 is connected to the first terminal 42_1 of the test block 42.

The gate 82G of the transistor 82 of the test block 42 is connected to the fourth terminal 42_4 of the test block 42 and the first terminal 78_1 of the second resistance 78 of the test block 42. The drain 82D of the transistor 82 of the test block 42 is connected to the fifth terminal 42_5 of the test block 42 and the first terminal 84_1 of the voltage regulator 84. The source 82S of the transistor 82 of the test block 42 is connected to the seventh terminal 42_7 and the tenth terminal 42_10 of the test block 42.

It is noteworthy that according to one failure mode (short-circuit of the voltage regulator 84), both the gate 82G and the source 82S receive a voltage of 24 V. The transistor 82 of the test block 42 is thus in a blocked state and the transmission of a high voltage (24 V in the case at hand) on the reference voltage of the interfaces 40A and 40B is prevented.

The first terminal 84_1 of the voltage regulator 84 is connected to the third terminal 42_3 of the test block 42 and the drain 82D of the transistor 82 of the test block 42. The second terminal 84_2 of the voltage regulator 84 is connected to the first terminal 80_1 of the third resistance 80 of the test block 42 and the second terminal 78_2 of the second resistance 78 of the test block 42. The third terminal 84_3 of the voltage regulator 84 is connected to the second terminal 42_2 of the test block 42.

The first terminal 42_1 of the test block 42 is connected to the fifth input 60 of the first input terminal 32.

The second terminal 42_2 of the test block 42 is connected to the fourth input 58 of the first input terminal 32.

The fifth input 60 and the fourth input 58 of the first input module 32 therefore connect the power supply of the sensors 14A, 14D, 16 and 18 to the first input module 32. The fifth input 58 of the first input module 32 receives the 0 V, which is the reference potential for the interfaces 40A, 40B.

The third terminal 42_3, fourth terminal 42_4, fifth terminal 42_5, sixth terminal 42_6, seventh terminal 42_7, eighth terminal 42_8 of the test block 42 are connected to the isolating part 44.

The ninth terminal 42_9 of the test block 42 is connected to the fourth terminal 40A4 of the first interface 40A and the fourth terminal 40B4 of the second interface 40B.

The tenth terminal 42_10 of the test block 42 is connected on the one hand to the seventh terminal 42_7 of the test block 42 and on the other hand to the third terminal 40A3 of the first interface 40A and the third terminal 40B3 of the second interface 40B.

The eleventh terminal 42_11 of the test block 42 is connected on the one hand to the sixth terminal 42_6 of the test block 42 and on the other hand to the second terminal 40A2 of the first interface 40A and the second terminal 40B2 of the second interface 40B.

The test block 42 makes it possible to provide, between the seventh terminal 42_7 of the test block 42 and the eighth terminal, a current indicating the presence of a power source at 24 V. A short-circuit between the fifth terminal 42_5 and sixth terminal 42_6 of the test block 42 also makes it possible to place the interfaces 40A and 40B in forcing mode. A short-circuit between the fourth terminal 42_4 and third terminal 42_3 of the test block 42 also makes it possible to place the interfaces 40A and 40B in the low state.

The isolating part 44 includes a first opto transistor 85A, a second opto transistor 85B, and three isolators 86, 88, 90.

In the example of FIG. 2, the first opto transistor 85A, the second opto transistor 85B and the first isolator 86 are inputs, while the second isolator 88 and the third isolator 90 are control outputs. For the first input module 32, on the contrary, the first opto transistor 85A, the second opto transistor 85B and the first isolator 86 are outputs, while the second isolator 88 and third isolator 90 are control inputs.

More specifically, the first isolator 86 makes it possible to indicate the presence of a power source at 24 V, while the second isolator 88 and the third isolator 90 are able to control short-circuits, respectively, between the fifth terminal 42_5 and sixth terminal 42_6 of the test block 42 and the second terminal 42_2 and third terminal 42_3 of the test block 42.

According to the example of FIG. 2, another transistor is an assembly of a photodiode and a phototransistor in optical communication. The photodiode and the phototransistor are isolated. The assembly direction is indicated by arrows in FIG. 2, the direction indicated by the arrows corresponding to the transmission from emission toward reception.

As example, in the case of FIG. 2, the isolators 86, 88 and 90 are also opto transistors.

Alternatively, each isolator 86, 88 and 90 is replaced by any other device making it possible to ensure isolation, such as a capacitive or inductive device.

For simplification reasons, the different internal connections of the opto transistor 85A, which comprises an optocoupler 92A, a resistance 94A and four terminals 85A1, 85A2, 85A3 and 85A4 are not described in detail below. Indeed, the internal connections of the opto transistor 85A follow from the fact that the output of the phototransistor of the opto transistor 85A is connected to the resistance 94A.

The first terminal 85A1 of the first opto transistor 85A is connected to the sixth terminal 40A6 of the first interface 40A.

The second terminal 85A2 of the first opto transistor 85A is connected to the fifth terminal 40A5 of the first interface 40A. The third terminal 85A3 of the first opto transistor 85A is connected to the first diagnostic block 46A.

The fourth terminal 85A4 is connected to the second output 48A2 of the first input module 32.

As a result of these connections, the voltage applied at the input of the first diagnostic block 46A is proportional to the current crossing through the photodiode (in read mode) of the first opto transistor 85A, and therefore proportional to the current supplied by the first sensor 14A. This makes it possible to diagnose several current values produced by the first sensor 14A connected to the first input 10A in a certain operating range of certain elements of the first input module 32.

The second opto transistor 85B is similar to the first opto transistor 85A, but interacts with the second interface 40B instead of the first interface 40A. The same remarks as above therefore apply for the second opto transistor 85B, replacing the letter A with the letter B in the references when applicable.

The first isolator 86 includes a first terminal 86_1, a second terminal 86_2 and a third terminal 86_3. The third terminal 86_3 of the first isolator 86 is isolated relative to the first terminal 86_1 and the second terminal 86_2 of the first isolator 86.

The first terminal 86_1 of the first isolator 86 is connected to the eighth terminal 42_8 of the test block 42. The second terminal 86_2 of the first isolator 86 is connected to the seventh terminal 42_7 of the test block 42. The third terminal 86_3 of the first isolator 86 is connected to the first input 52 of the input module 32.

The second isolator 88 includes a first terminal 88_1, a second terminal 88_2 and a third terminal 88_3. The third terminal 88_3 of the second isolator 88 is isolated relative to the first terminal 88_1 and the second terminal 86_2 of the second isolator 88.

The first terminal 88_1 of the second isolator 88 is connected to the sixth terminal 42_6 of the test block 42. The second terminal 88_2 of the second isolator 88 is connected to the fifth terminal 42_5 of the test block 42. The third terminal 88_3 of the second isolator 88 is connected to the second input 54 of the input module 32 via a resistance 92.

The third isolator 90 includes a first terminal 90_1, a second terminal 90_2 and a third terminal 90_3. The third terminal 90_3 of the third isolator 90 is isolated relative to the first terminal 90_1 and the second terminal 90_2 of the third isolator 90.

The first terminal 90_1 of the third isolator 90 is connected to the fourth terminal 42_4 of the test block 42. The second terminal 90_2 of the third isolator 90 is connected to the third terminal 42_3 of the test block 42. The third terminal 90_3 of the third isolator 90 is connected to the input 56 of the input module 32 via a resistance 94.

Thus, it appears that the second and third isolators 88 and 90 represent a programmable switch making it possible to modify the operation of the test block 42.

The first diagnostic block 46A includes a comparator 100A and a decoding unit 102A.

The comparator 100A is a multi-threshold comparator, i.e., the comparator is able to compare a voltage to several thresholds, three in the case of FIG. 2.

The comparator 100A includes four terminals 100A1, 100A2, 100A3 and 100A4.

The decoding unit 102A is able to deduce the diagnosis of the tested element from the result of the comparison by the comparator 100A when the interface 40A or 40B is in a read state. For example, if the second threshold is reached, the decoding unit 102A determines that the test element is not receiving more current than the anticipated nominal current.

The decoding unit 102A comprises four terminals 102A1, 102A2, 102A3 and 102A4.

The first terminal 100A1 of the comparator 100A is connected to the third terminal 85A3 of the first opto transistor 85A. The second terminal 100A2 of the comparator 100A is connected to the first terminal 102A1 of the decoding unit 102A. The third terminal 100A3 of the comparator 100A is connected to the second terminal 102A2 of the decoding unit 102A. The fourth terminal 100A4 of the comparator 100A is connected to the third terminal 102A3 of the decoding unit 102A.

The first terminal 102A1 of the decoding unit 102A is connected to the second terminal 102A2 of the comparator 100A. The second terminal 102A2 of the decoding unit 102A is connected to the third terminal 100A3 of the comparator 100A. The third terminal 102A3 of the decoding unit 102A is connected to the fourth terminal 100A4 of the comparator 100A. The fourth terminal 102A4 of the decoding unit 102A is connected to the first output 48A1 of the first input module 32.

The second diagnostic block 46B is similar to the first diagnostic block 46A, but interacts with the second opto transistor 85B instead of the first opto transistor 85A. The same remarks as above therefore apply to the second diagnostic block 46B, replacing the letter A with the letter B in the references when applicable.

The first output 48A1 of the first input module 32 is connected to the fourth output 102A4 of the decoding unit 102A of the first diagnostic block 46A. Thus, the diagnostic line of the first sensor 14A is connected to the interface 40A.

The second output 48A2 of the first input module 32 is connected to the fourth terminal 85A4 of the first opto transistor 85A. Thus, the state line of the first sensor 14A is connected to the interface 40A.

The third output 50B1 of the first input module 32 is connected to the fourth terminal 102B4 of the decoding unit 102B of the second diagnostic block 46B.

The fourth output 50B2 of the first input module 32 is connected to the fourth terminal 85B4 of the second opto transistor 85B.

The first input 52 of the first input module 32 is connected to the third terminal 86_3 of the first isolator 86.

The first input 52 is able to provide the operating state of the power supply at 24 V.

The second input 54 of the first input module 32 is connected to the third terminal 88_3 of the second isolator 88 via the resistance 92.

The third input 56 of the first input module 32 is connected to the third terminal 90_3 of the third isolator 90 via the resistance 94.

The fourth input 58 of the first input module 32 is connected on the one hand to a voltage source of 0 V corresponding to the low state, and on the other hand to the second terminal 42_2 of the test block 42.

The fifth input 60 of the first input module 32 is connected on the one hand to a voltage source of 24 V corresponding to the forcing state, and on the other hand to the first terminal 42_1 of the test block 42.

The second input/output module 34 is connected to the third output 10C and fourth output 10D of the controller 10. The second input/output module 34 is able to ensure secure interfacing between the central processing unit 28 and the actuator 16 and the sensor 14B respectively connected to the third output 10C and the fourth output 10D.

The operation of the controller 10, and more specifically of the first input module 32, will now be described in reference to an example of a testing method for the first input module 32.

The testing method includes a first step in which the test block 42 imposes a forcing state on each sixth terminal 40A6, 40B6 of each interface 40A, 40B. To that end, according to the example of FIGS. 1 and 2, the first processing unit 24 applies a forcing state to the second input 54 of the first input module 32. This forcing state is relayed by the second isolator 88 to the sixth terminal 42_6 of the test block 42. Since the sixth terminal 42_6 of the test block 42 is connected to the eleventh terminal 42_11 of the test block 42, the eleventh terminal 42_11 is in the forcing state. This requires that the second terminals 40A2 and 40B2 of each of the interfaces 40A, 40B be in the forcing state. Each second diode 64A, 64B then goes to the on state and a voltage is applied on the collector 74AC, 74BC of each transistor 74A, 74B. As a result, if there is no normal operating anomaly, the sixth terminal 40_A6, 40B_6 of each of the interfaces 40A, 40B is also in the forcing state.

The method then includes a second step for verifying the operating state of the input module 32 when the test block 42 imposes a forcing state on each sixth terminal 40A6, 40B6 of each interface 40A, 40B. Such a second step is implemented by the processing sub-module 24. The processing sub-module 24 evaluates the state of the second output 48A2 of the first input module 32, the state of the fourth output 50B2 of the first input module 32 and the state of the first input 52 of the input module 32. On the one hand, the presence of a high state on the second output 48A2 of the first input module 32 and on the fourth output 50B2 of the first input module 32 means that the interfaces 40A and 40B are able to produce a high state on the second output 48A2 of the first input module 32 and on the fourth output 50B2 of the first input module 32. On the other hand, the presence of a high state on the first input 52 of the input module 32 shows that the test block 42 is able to produce the reference voltage to be applied to the input module 32 and that the input module 32 is indeed receiving power.

The testing method includes a third step in which the test block 42 imposes a low state on each sixth terminal 40A6, 40B6 of each interface 40A, 40B. To that end, according to the example of FIGS. 1 and 2, the first processing unit 24 applies a forcing state to the third input 56 of the first input module 32. This forcing state is relayed by the third isolator 90, which then has a short-circuit between the second terminal 42_2 of the test block 42 and the third terminal 42_3 of the test block 42. The transistor 82 of the test block 42 is then in a blocked state and the tenth terminal 42_10 of the test block 42 no longer produces reference voltage on the third terminal 40A3 of the first interface 40A and the third terminal 40B3 of the second interface 40B. This requires that the third terminals 40A3 and 40B3 of each of the interface 40A, 40B be in the low state. Because these third terminals 40A3 and 40B3 are respectively connected with the base 74AB and 74BB of each transistor 74A, 74B of each interface 40A, 40B, this results, when there is no normal operating anomaly, in the sixth terminal 40_A6, 40B_6 of each of the interfaces 40A, 40B being in the low state.

The method then includes a fourth step for verifying the operating state of the input module 32 when the test block 42 imposes a low state on each sixth terminal 40A6, 40B6 of each interface 40A, 40B. Such a fourth step is implemented by the processing sub-module 24. The processing sub-module 24 evaluates the state of the second output 48A2 of the first input module 32, the state of the fourth output 50B2 of the first input module 32 and the state of the first input 52 of the input module 32. On the one hand, the presence of a low state on the second output 48A2 of the first input module 32 and on the fourth output 50B2 of the first input module 32 means that the interfaces 40A and 40B are able to produce a low state on the second output 48A2 of the first input module 32 and on the fourth output 50B2 of the first input module 32 through opto transistors 85A and 85B. On the other hand, the presence of a low state on the first input 52 of the input module 32 shows that the first isolator 86 is able to indicate a lack of reference signal voltage.

The testing method then comprises a step for deducing the operating state of the first input module 32 based on the results of the second and fourth verification steps.

In order to simplify the notations, the results obtained at the end of the second verification step and the fourth verification step are denoted in the form of a result vector (E1, E2, E3, E4, E5 and E6), where E1 represents the state of the second output 48A2 of the first input module 32 in the second step; E2 represents the state of the fourth output 50B2 of the first input module 32 in the second step; E3 represents the state of the first input 52 of the input module 32 in the second step; E4 represents the state of the second output 48A2 of the first input module 32 in the fourth step; E5 represents the state of the fourth output 50B2 of the first input module 32 in the fourth step; and E6 represents the state of the first input 52 of the input module 32 in the fourth step. Furthermore, each of the states E1, E2, E3, E4, E5, E6 assumes a value equal to 0 when the state is a low state and a value equal to 1 when the state is a high state.

When the result vector is (0, 0, 0, 0, 0, 0), this means that the power supply is missing. The controller 10 is told that the state of the inputs 10A and 10B does not affect the state of the sensor 14A and the emergency stop button 18. Furthermore, the controller 10 is told that the input module 32 is not broken down.

When the result vector is (1, 1, 1, 0, 0, 0), the controller 10 is given the information relative to the state of the input without indicating a fault. More specifically, in the case at hand, the sensor 14A and the emergency stop button 18 are in the closed state. A high state in the second step cannot be indicated when the element connected to the input in question is open.

For all of the other results vectors. It is determined that an operating anomaly has occurred and that the input module 32 is no longer able to deliver secure information.

In particular, when the result vector is (1, 0, 1, 1, 0, 0), (1, 0, 1, 0, 1, 0), (0, 1, 1, 1, 0, 0) or (0, 1, 1, 0, 1, 0), one of the two interfaces 40A or 40B has a fault.

When the result vector is (0, 0, 1, , -, -, -) or (-, -, -, 1, 1, 0), with "-" meaning 0 or 1, both interfaces 40A, 40B have a fault or a forcing command is broken.

When the result vector is (1, 1, 0, 0, 0, 0), the voltage regulator 84 has short-circuited.

When the result vector is (1, 1, 1, 0, 0, 1), the first input 52 of the input module 32 is broken.

Thus, the processing sub-module 24 is able to determine an operating anomaly of one or both interfaces 40A, 40B and/or the test block 42 and/or the isolating part 44 when the state of the sixth terminal 40A6, 40B6 of at least one interface 40A, 40B differs from the forcing state whereas the state imposed by the test block 42 is the forcing state.

Similarly, the processing sub-module 24 is able to determine an operating anomaly of the isolating part 44 when the state of the sixth terminal 40A6, 40B6 of at least one interface 40A, 40B differs from the low state whereas the state imposed by the test block 42 is the low state.

In order to better understand the capacity of the testing method to determine an operating anomaly, it is appropriate to consider the failure cases to be contemplated for the various components belonging to the first input module 32. Hereinafter, a component failure is considered to be a failure only if that failure affects the measurement of the level of the input 32A of the input module 32 and is not detectable by the various tests performed upon each diagnosis period of the input module 32. As a corollary, a component failure that disrupts the measurement of the input voltage 32A of the input module 32 that is detected by at least one of the diagnostics is not considered a failure, even though such a fault implies the replacement of the input module 32.

By definition, the diagnostic period is set so as to guarantee the reliability of the input module 32: by reducing the diagnostic period, the likelihood of the component becoming faulty between two tests decreases proportionally. In the extreme, when the diagnostic period is equal to the sampling period, only failures that are undetectable by the diagnostics and having unwanted consequences will participate in the evaluation, for the input module 32, of the mean time between two failures, that expression often being designated using the acronym MTTF (mean time between failures). The analysis that follows is intended to determine the component failures that will not be detected by the diagnostics. For clarity reasons, the term "mean time between failures" is reserved for the components of the first input module 32, while the expression "diagnostic period" is reserved for the first input module 32 as a whole.

For the isolator 92A of the first opto transistor 85A, the photodiode may break before the diagnostic period. This prevents a forcing state from being detected at the sixth terminal 40A6 of the first interface 40A whereas a forcing state is imposed.

For the isolator 92A of the first opto transistor 85A, the phototransistor may be short-circuited, which prevents a low state from being detected at the sixth terminal 40A6 of the first interface 40A whereas a low state is imposed.

For the isolator 92B of the second opto transistor 85B, the photodiode may break before the diagnostic period. This prevents a forcing state from being detected at the sixth terminal 40B6 of the second interface 40B whereas a forcing state is imposed.

For the isolator 92B of the second opto transistor 85B, the phototransistor may be short-circuited, which prevents a low state from being detected at the sixth terminal 40B6 of the second interface 40B whereas a low state is imposed.

For the transistor 74A of the first interface 40A, the connection between the transmitter 74AE and the collector 74AC can be broken. This prevents a forcing state from being detected at the sixth terminal 40A6 of the first interface 40A whereas a forcing state is imposed.

For the transistor 74A of the first interface 40A, a short-circuit between the transmitter 74AE and the collector 74AC does not interfere with the operation of the first input module 32, more specifically with the security of the information produced by the first interface 40A.

For the transistor 74B of the second interface 40B, the connection between the transmitter 74BE and the collector 74BC can be broken. This prevents a forcing state from being detected at the sixth terminal 40B6 of the second interface 40B whereas a forcing state is imposed.

For the transistor 74B of the second interface 40B, a short-circuit between the transmitter 74BE and the collector 74BC does not interfere with the security of the information produced by the second interface 40B of the first input module 32.

For the transistor 82 of the test block 42, the connection between the source 82S and the drain 82D can be broken. This prevents the third input 52 of the first input module 32 from being in a high state, whereas a forcing input state is imposed.

For the transistor 82 of the test block 42, a short-circuit between the source 82S and the drain 82D does not interfere with the security of the information produced by the first interface 40A and the second interface 40B of the first input module 32.

Since the mean time between failures of a resistance is greater than the diagnostic period of an input module 32, none of the resistances 66A, 66B, 68A, 68B, 70A, 70B, 72A, 72B, 76, 78, 80, 94A, 94B, 92, 94 of the first input module 32 interferes with the operation thereof.

Similarly, the mean time between failures of the diode exceeds the diagnostic period of an input module 32, and therefore none of the diodes 62A, 62B, 64A, 64B of the first input module 32 interfere with the operation thereof.

For the first isolator 86, the photodiode of the isolator 86 may experience a failure during the diagnostic period of an input module 32. Such a failure prevents the third input 52 of the first input module 32 from being in a high state whereas a forcing input state is imposed.

Furthermore, for the first isolator 86, the phototransistor may be short-circuited. In that case, the third input 52 of the first input module 32 is prevented from being in a low state whereas the voltage reference has been disconnected.

For the second isolator 88, the photodiode may break before the diagnostic period. This failure prevents forcing of the eleventh terminal 42_11 of the test block 42 whereas a forcing state, a low state, respectively, is imposed.

For the second isolator 88, the phototransistor may be short-circuited, which imposes a high state on the eleventh terminal 42_11 of the test block 42 and a low state on the tenth terminal 42_10 of the test block 42 whereas a forcing state is imposed. As a result, the inputs of the interface 40A, 40B are forced to a high state.

For the third isolator 90, the photodiode may break before the diagnostic period. This failure prevents placing the tenth terminal 42_10 of the test block 42 in a low state whereas a forcing state, a low state, respectively, is imposed.

For the third isolator 90, the phototransistor may be short-circuited, which prevents a high state from being detected at the sixth terminal 40A6 of the first interface 40A and at the sixth terminal 40B6 of the second interface 40B whereas a forcing state is imposed.

For the voltage regulator 84, a short-circuit between its second terminal 84_2 and its third terminal 84_3 prevents a forcing state from being detected on the third input 52 of the first input module 32 whereas a forcing state is imposed.

In summary, in other words, the first step of the method requires the second isolator 88 to behave as a closed circuit. This means that current from the voltage regulator 84 is injected into the two opto transistors 85A and 85B via the second diodes 64A and 64B and the transistors 74A and 74B of the two interfaces 40A and 40B.

Additionally, it is verified that the reference voltage is also present on the seventh terminal 42_7 and the tenth terminal 42_10 of the test block 42.

When there is no operating anomaly, each sixth terminal 40A6 and 40B6 of the two interfaces 40A and 40B is in the forcing state, which makes it possible to validate the absence of an operating anomaly of the voltage regulator 84, the isolators 92A and 92B of the two opto transistors 85A and 85B (the phototransistor is not short-circuited), the transistors 74A and 74B of the two interfaces 40A and 40B and the second isolator 88.

During the third step of the method, the third isolator 90 generates a short-circuit between the source 82S and the gate 82G of the transistor 82 of the test block 42. Thus, the voltage regulator 84 is no longer connected to the third terminals 40A3 and 40B3 of the two interfaces 40A and 40B. As a result, no current may circulate in the photodiodes of the opto transistors 85A and 85B, and a voltage of 24 V is imposed at the input thereof. Furthermore, the first isolator 83 no longer receives current in the photodiodes.

In the absence of an operating anomaly, each sixth terminal 40A6 and 40B6 of the two interfaces 40A and 40B is in the low state, which makes it possible to validate the absence of short-circuit of the two opto transistors 85A and 85B (the transistors are not in short-circuit), the first and second isolators 86 and 88, and the third isolator 90 is not cut.

As a result, it has been shown that the first input module 32 makes it possible, using the example testing method previously described, to perform a test of the proper operation of the components of the first input module 32.

It should be noted that, according to the described example, each interface 40A, 40B only comprises components whose failure mode is known, i.e., resistances 66A, 68A, 70A, 72A, 66B, 68B, 70B, 72B, a diode 62A, 64A, 62B, 64B, a transistor 74A, 74B or a simple voltage regulator.

More specifically, it may be shown that such a module is compatible with the requirements of standard SIL4 as defined in normative document EN61508, that standard dealing with the functional security of electrical/electronic/programmable electronic systems relative to security. This in particular means that the failure rate is below 1%.

Furthermore, this avoids proposing an architecture for the first input module 32 in which each input 10A, 10B is provided with at least two interfaces. In the case at hand, a single interface 40A, 40B is provided for each input 10A, 10B. It should be noted that the first input module 32 has been described for two inputs 10A, 10B to simplify the diagrams, but of course, the number of interfaces 40 may be as large as desired, since each interface 40 is connected in parallel. In practice, the number of interfaces 40 corresponds to the number of inputs of the considered input module. This makes it possible to decrease the bulk associated with the first input module 32 while guaranteeing a good security level.

Furthermore, it appears that the test sequence is simple, since it involves a forcing phase of the sixth terminals 40A, 40B of the interfaces 40A, 40B in the forcing state to verify that there is no interfering fault to produce a forcing state, followed by a forcing phase of the sixth terminals 40A, 40B of the interfaces 40A, 40B in the low state to verify that there is no interfering fault to produce a low state. This simplicity makes it possible to perform the test sequence upon each read cycle. Thus, according to one preferred embodiment, the method comprises the test phase with the two forcing operations, the read phase for the read data in which the sixth terminal 40A6, 40B6 of the interface 40A, 40B is able to deliver an image of the signal received by the input 32A, 32B associated with the considered interface 40A, 40B. This method is cyclic, i.e., once the read phase is complete, a new test phase is carried out, once again followed by a read phase, and so forth.

In the specific case described, the transistors 74A and 74B of each interface 40A, 40B make it possible to limit the current of the sixth terminal 40A6, 40B6 of the interface 40A, 40B. This results in a limitation of the power dissipated by the interface 40A, 40B.

As a replacement for the components proposed for the specific input module 32 of FIG. 2, one skilled in the art is capable of proposing other components performing similar functions, knowing that the components whereof the mean time between failures is strictly greater than the diagnostic period of the input module 32 are to be favored, since they make it possible to obtain a testing method that is easier to implement.

The invention claimed is:

1. An input module for a programmable logic controller able to be connected to a plurality of elements of an automated chain, the input module comprising:
   inputs, each input being able to receive the signal from at least one element of the plurality of elements,
   interfaces, each interface being associated with a single input and comprising at least one output able to operate in three different states:
      a forcing state corresponding to the maximum voltage that the output of the interface is able to deliver,
      a low state corresponding to the minimum voltage that the output of the interface is able to deliver, and
      a read state in which the output of the interface is able to deliver an image of the signal received by the input associated with the considered interface,
   a test block connected to each of the interfaces and able to impose the state of the output of each interface, and
   a processing sub-module able to compare the state of the output of each interface with the state imposed by the test block and to deduce an operating anomaly of the input module therefrom when the state of the output of at least one interface differs from the state imposed by the test block.

2. The input module according to claim 1, wherein each interface comprises components having a known failure mode, preferably each component being uniquely chosen from the group consisting of a resistance, a transistor and a diode.

3. The input module according to claim 1, wherein each interface is identical.

4. The input module according to claim 2, wherein each interface is identical.

5. The input module according to claim 1, wherein each interface includes a single transistor able to modify the state of the output of the interface.

6. The input module according to claim 5, wherein the input module further includes an isolating part isolating the processing sub-module from the interfaces and the test block.

7. The input module according to claim 1, wherein the input module further includes a power source specific to the test block.

8. The input module according to claim 1, wherein the processing sub-module is able to determine:
   an operating anomaly of at least one of the elements of the group made up of one or both interfaces and/or the test block and/or the isolating part when the output state of at least one interface differs from the forcing state whereas the state imposed by the test block is the forcing state,
   an absence of operating anomaly when the test block is not powered on, and
   an operating anomaly of at least one of the elements of the group made up of the interfaces and the test block when the output state of at least one interface differs from the low state whereas the state imposed by the test block is the low state.

9. The input module according to claim 1, wherein the processing sub-module is able to cyclically impose the forcing state, the low state, then the read state at each output of each interface.

10. A programmable logic controller including at least one input module according to claim 1.

11. A testing method for an input module for a programmable logic controller able to be connected to a plurality of elements of an automated chain, the input module comprising:
   inputs, each input being able to receive the signal from at least one element of the plurality of elements,
   interfaces, each interface being associated with a single input and comprising at least one output able to operate in three different states:
      a forcing state corresponding to the maximum voltage that the output of the interface is able to deliver,
      a low state corresponding to the minimum voltage that the output of the interface is able to deliver, and
      a read state in which the output of the interface is able to deliver an image of the signal received by the input associated with the considered interface,
   a test block connected to each of the interfaces and able to impose the state of the output of each interface, and
   a processing sub-module able to compare the state of the output of each interface with the state imposed by the test block and to deduce an operating anomaly of the input module therefrom when the state of the output of at least one interface differs from the state imposed by the test block,
the method comprising the following steps:
   imposing a forcing state on each output of each interface,
   verifying the operating state of the input module when a forcing state is imposed on each output of each interface,
   imposing a low state on each output of each interface,
   verifying the operating state of the input module when a low state is imposed on each output of each interface, and deducing the operating state of the first input module based on the results of the verification steps.

* * * * *